United States Patent [19]

Stallkamp

[11] Patent Number: 4,668,962

[45] Date of Patent: May 26, 1987

[54] THERMAL PRINT HEAD

[75] Inventor: Richard A. Stallkamp, Los Gatos, Calif.

[73] Assignee: Wang Laboratories, Inc., Lowell, Mass.

[21] Appl. No.: 873,438

[22] Filed: Jun. 5, 1986

Related U.S. Application Data

[63] Continuation of Ser. No. 687,069, Dec. 28, 1984, abandoned.

[51] Int. Cl.[4] .......... G01D 15/10

[52] U.S. Cl. .......... 346/76 PH; 400/120; 219/543

[58] Field of Search .......... 346/76 PH, 76 R, 139 C; 219/216 PH, 543; 250/317.1, 318; 400/120; 338/307-309

[56] References Cited

U.S. PATENT DOCUMENTS

| | | | |
|---|---|---|---|
| 4,074,109 | 2/1978 | Bakaff et al. | 346/76 PH |
| 4,423,424 | 12/1983 | Takayama | 346/76 PH |
| 4,435,634 | 3/1984 | Horlander | 219/216 |
| 4,450,342 | 5/1984 | Goff, Jr. et al. | 219/216 |
| 4,459,462 | 7/1984 | Rakes | 346/76 PH |

FOREIGN PATENT DOCUMENTS

| | | | |
|---|---|---|---|
| 58-212970 | 10/1983 | Japan | 346/76 PH |
| 0212970 | 12/1985 | Japan | 346/76 PH |

*Primary Examiner*—Arthur G. Evans

*Attorney, Agent, or Firm*—Michael H. Shanahan

[57] ABSTRACT

A thermal print head includes electrical heating elements for marking a heat sensitive medium, and buses for delivering power to the elements (each bus being connected in common to a number of the elements); a power source applies to one of the buses a first voltage level which is at least sufficient, when applied to one of the elements, to cause marking, and the power source holds a second bus at a fixed second voltage level insufficient for causing marking. In other aspects, each element in the row is connected between a conductor for supplying power to and a conductor for sinking power from the element, and some of the sink conductors extend on one side of the row while other sink conductors extend on the other side of the row (for making electrical connection to a power sink); there are a number (N) of parallel rows of elements, and there are 2N buses, each bus being connected in common to a plurality of elements, and there is control logic for routing power via each one of the buses in turn; and at least one of the buses is on one side of the rows of elements, and at least another one of the buses is on the opposite side of the rows.

7 Claims, 4 Drawing Figures

THERMAL PRINT HEAD

This is a continuation of application Ser. No. 687,069, filed Dec. 28, 1984 now abandoned, entitled THERMAL PRINT HEAD.

BACKGROUND OF THE INVENTION

This invention relates to thermal print heads.

In typical heads, a row of electrically resistive heating elements are defined along the length of a resistive stripe by a series of conductive fingers which cross the stripe at regular intervals. Each heating element is thus spaced apart from the next element by the width of the finger which separates them and each element is bordered by and connected to the two associated fingers which define the element. In order to print a dot on a sheet of heat-sensitive paper, an individual element is heated by driving current through it. A voltage is applied to one of the element's two associated fingers to supply power, and the other finger is grounded to withdraw (sink) power from the element. By printing a set of selected dots in one row, then moving the paper a short distance (in a direction perpendicular to the resistive stripe) to a new position at which another set of selected dots is printed, and then repeating these steps, patterns of dots corresponding to alphanumeric characters or graphic symbols are formed.

Typically, every other finger along the stripe extends in one direction away from the stripe to connect to integrated circuitry which is arranged to permit grounding of various ones of the fingers at different times. The intervening fingers (to which the voltage is to be applied) are not connected to the grounding integrated circuitry, but instead extend away from the stripe in the opposite direction from the grounding fingers. Every other one of these voltage fingers is routed to a first bus which runs parallel to the stripe, while the remaining voltage fingers are routed to a second bus, which also runs parallel to the stripe.

The printing of dots along a row is done in two phases: first, a voltage is applied to the first bus, and appropriate grounding fingers are grounded to cause heating of the elements corresponding to the desired dot positions; second, the voltage is applied to the second bus, and other appropriate grounding fingers are grounded.

Diodes are connected between each voltage finger and the bus to which it is routed to prevent so-called parasitic voltages from appearing on the bus to which the voltage is not being applied. Such parasitic voltages may erroneously cause printing by elements which have not been selected for heating.

SUMMARY OF THE INVENTION

In general, the invention features, in one aspect, applying to one of several buses a first voltage level which is at least sufficient, when applied to one of the elements, to cause marking, while holding a second bus at a fixed second voltage level insufficient for causing marking.

In preferred embodiments, the heating elements are arranged in rows (e.g., two parallel rows), and there are a series of conductors for sinking power from the elements, with every other one of these conductors extending on one side of the rows, and the intervening conductors extending on the other side, with each conductor serving two elements on each row, and each element being served by one of the conductors; and there are four buses (double the number of rows), with two of the buses being arranged on one side of the rows so as to be adjacent to and to serve one of the rows, and with the other two buses being arranged on the other side of the rows so as to be adjacent to and to serve the other one of the rows.

Also in preferred embodiments, the elements are regularly spaced along the rows, with spaces between successive elements (each element having, e.g., a length equal to the length of one of the spaces), and one of the rows is offset from the other row (e.g., by an amount equal to the space length) such that in a projection of one row onto the other row, the elements of the one row would cover at least a portion of the spaces along the other row.

Also in preferred embodiments, the power sinking conductors selectively connect the elements to a predetermined third voltage level, such that the voltage difference between the first and third voltage levels is sufficient to cause marking, but the voltage difference between the second and third voltage levels, and the voltage difference between the first and second voltage levels, are each insufficient to cause marking; the second voltage level is lower than the first voltage level and is selected to have a value, relative to the first voltage level, which minimizes the aggregate power loss in the heating elements, e.g., a value equal to the third voltage level plus 3/7 of the difference between the first voltage level and the third voltage level; control logic is provided for connecting the first voltage level from the power source to a selected one of the buses while connecting the second voltage level from the power source to the other buses; and the control logic connects selected ones of the elements to a power sink while the bus connected to the selected elements is connected to the first voltage level, to cause marking by the selected elements.

In another aspect, the invention features a thermal print head in which each element in the row is connected between a conductor for supplying power to and a conductor for sinking power from the element, and some of the sink conductors extend on one side of the row while other sink conductors extend on the other side of the row for making electrical connection to a power sink.

In another aspect, the invention features a thermal print head having a number (N) of parallel rows of electrical heating elements for marking a heat sensitive medium, conductors for sinking power from the elements, 2N electrical buses for routing power to the elements, each bus being connected in common to a plurality of elements, and control logic for routing power via each one of the buses in turn.

In another aspect, the invention features a thermal print head having a row of electrical heating elements for marking a heat sensitive medium, buses parallel to the row of elements for routing power to the elements, at least one of the buses being on one side of the row, and at least another one of the buses being on the opposite side of the row.

By holding the non-printing buses to a fixed second voltage level insufficient to cause marking, no diodes are required to counteract the parasitic voltages which could otherwise appear on the non-printing buses. Eliminating the diodes reduces the design and manufacturing costs and improves the reliability of the head, by making more space available on the head substrate. The availability of space also permits the use of four buses, two on each side of the elements. Four buses enables the use of two rows of printing elements, each served by two of the buses. By connecting each sink conductor to both rows, each sink conductor can serve four elements. Having alternate sink conductors lead out to different sides of the element rows, reduces the density of the required switching circuitry on the substrate which reduces design and manufacturing complexity and cost, and improves reliability. Using four buses permits four-stage printing which reduces the peak power load. Offseting the two rows of elements with respect to each other assures that every location on a page can be printed.

Other advantages and features of the invention will become apparent from the following description of the preferred embodiment, and from the claims.

DESCRIPTION OF THE PREFERRED EMBODIMENT

We first briefly describe the drawings.

Drawings

Structure

Figure 1:
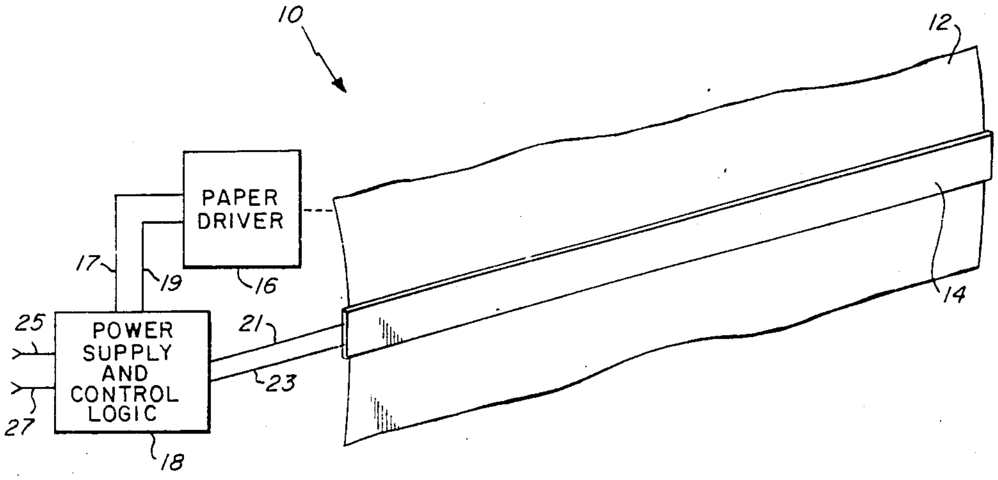
FIG. 1 is a schematic view of a thermal printing system.

Referring to FIG. 1, in thermal printing system 10 a sheet of temperature-sensitive paper (or plain paper in conjunction with an ink-bearing temperature-sensitive ribbon) 12 is held against a thick-film thermal print head 14. Paper driver 16 is arranged to move paper 12 to a succession of fixed positions with respect to head 14. Paper driver 16 is connected via control signal line 17 and power line 19 to a power supply and control logic 18 (for providing power and control signals to cause paper driver 16 to move paper 12 to the successive positions). Power supply and control logic 18 is also connected via control signal lines 21 and bus power lines 23 to head 14 (for providing power and control signals for causing head 14 to print a desired set of dots with respect to each successive position of paper 12). Power supply and control logic 18 is also connected via control signal line 25 and data line 27 to a microprocessor (not shown) for receiving streams of bits representative of information to be printed, and for receiving and sending related control signals.

Figure 2:
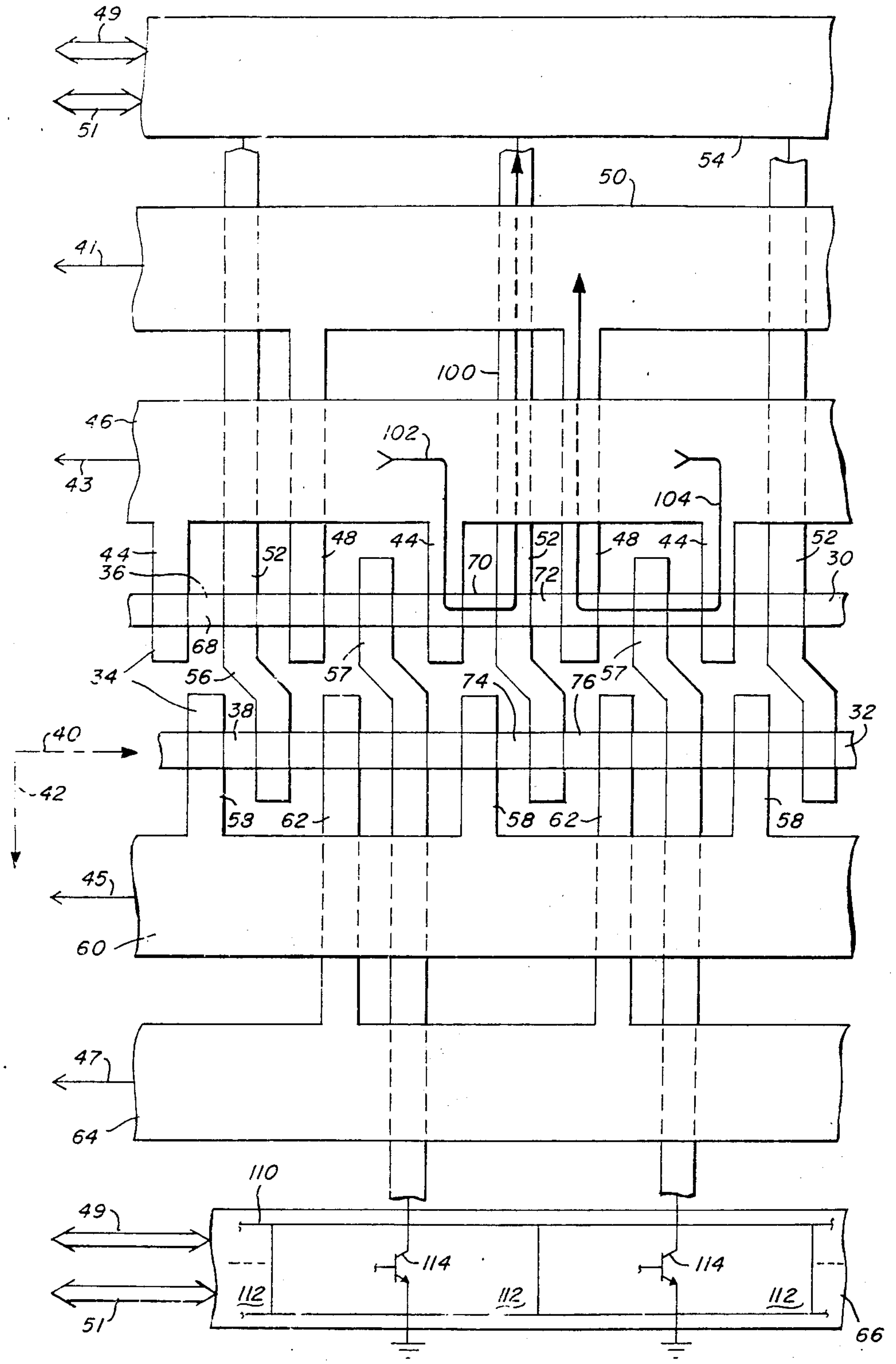
FIG. 2 is a view of a representative segment along the length of the thermal print head of FIG. 1, including integrated circuitry shown schematically.

Referring to FIG. 2, in head 14, a pair of parallel resistive stripes (each 0.0833 mm wide) of palladium-silver or palladium-gold 30, 32, are crossed by a series of conductive fingers 34 (each 0.0833 mm wide) also of palladium-silver or palladium gold. The rows are separated by a 0.25 mm space and the conductive fingers are spaced at regular intervals to define two parallel rows of printing elements 36, 38 (each 0.0833 mm square). Elements 36 are offset from elements 38 along an imaginary axis 40 by a distance of 0.0833 mm such that, if elements 38 were moved along an axis 42 to the location of row 30, each element 38 would fill the space between a pair of adjacent elements 36. There are a total of 2,592 elements along the 8 ½" print head length (only a few are shown in FIG. 2) with 1,296 elements in each row.

The fingers 34 which cross row 30 are arranged in four groups. One group of fingers 44 is connected to a conductive bus 46 oriented parallel to row 30. A second group of fingers 48 (only two are shown in Fig. 2) passes under and is insulated from bus 46 and connects to a second bus 50 also oriented parallel to row 30. A third group of fingers 52 passes under and is insulated from both buses 46 and 50 and connect to integrated circuit 54 (for connecting selected fingers 52 to ground). Fingers 52 also extend to and cross row 32 and have jogs 56 to accommodate the offset between elements 36, 38. A fourth group of fingers 57 extend to and beyond stripe 32.

Likewise, the fingers 34 which cross stripe 32 are arranged in four groups, including fingers 52 in one group, fingers 58 which connect to a bus 60 (on the other side of stripes 30, 32 from buses 46, 50) in a second group, fingers 62 which connect to a bus 64 in a third group, and fingers 57 which connect to integrated circuitry 66 in a fourth group.

Each finger 52, by virtue of crossing both stripes 30, 32 is connected to four elements, which are served individually by one of the four buses 46, 50, 60, 64. For example, a finger 52 connects to elements 70, 72, 74, 76, which in turn are connected respectively to buses 46, 50, 60, 64. Likewise, each finger 57 is connected to four elements also served respectively by one of the four buses 46, 50, 60, 64.

Each pair of adjacent fingers 57 have four elements 38 positioned between them, and each pair of adjacent fingers 52 likewise have four elements 36 positioned between them.

Buses 46, 50, 60, 64, and integrated circuits 54, 66 are each connected independently via lines 41, 43, 45, 47, 49, 51, to power supply and control logic 18.

Integrated circuitry 66 represents one of six identical circuits arranged along the length of head 14 on one side of rows 30, 32; integrated circuit 54 is identical to integrated circuit 66 and likewise represents one of six identical circuits on the other side of rows 30, 32. Each integrated circuit has fifty-four cells to serve fifty-four fingers 52, 57. Thus the twelve circuits are able to serve all 648 of fingers 52, 57.

Integrated circuitry 66 includes a shift register 110 having a set of cells 112. Each cell 112 includes a transistor 114 whose emitter is grounded, whose collector is connected to a particular one of the fingers 57, and whose base is controlled by the value of a bit stored in the cell. When the bit has one value, transistor 114 is driven to saturation so that the corresponding finger 57 is effectively grounded (actually the finger is drawn down to the saturation voltage $V_{sat}$, of transistor 114, e.g., 0.3 volts). When the bit has the opposite value, transistor 114 is off and the potential on the corresponding finger 57 is permitted to float.

Figure 3:
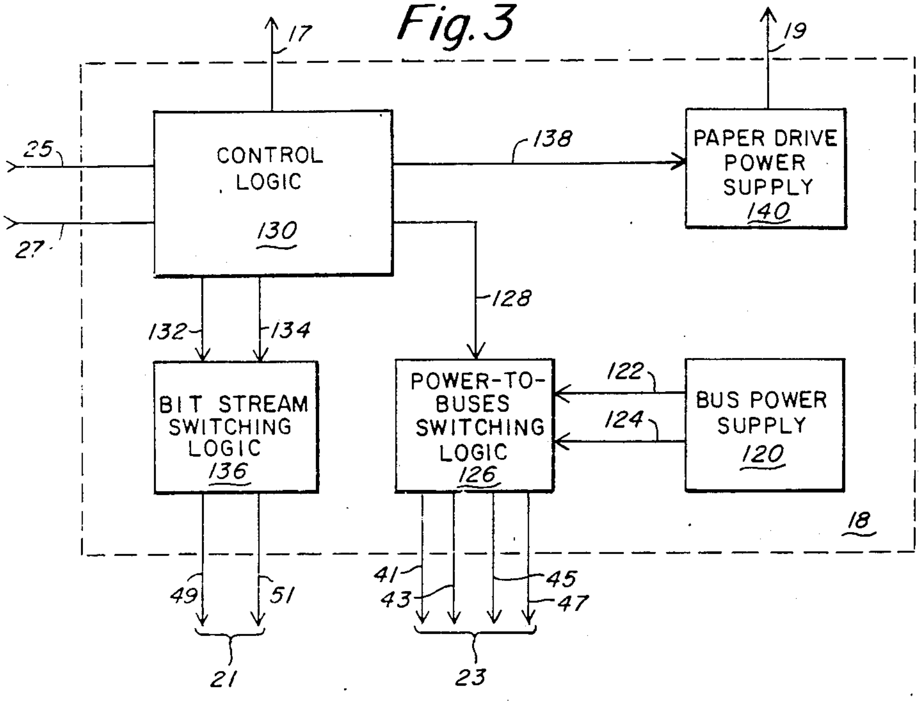
FIG. 3 is a schematic view of the power supply and control logic of FIG. 1.

Referring to FIG. 3, power supply and control logic 18 includes a bus power supply 120 capable of producing highly regulated voltages at two levels: a higher level for causing printing at a selected element (the higher level is selected so that the voltage drop across a given element will drive current sufficient to cause the element to heat to a temperature which causes marking) and a lower level for driving the non-printing buses (the lower level is selected so that the voltage drop across a given element will not be sufficient to cause printing). Bus power supply 120 is connected via high and low voltage lines 122, 124 to power-to-buses switching logic 126. Logic 126 has outputs connected to bus connection lines 41, 43, 45, 47 for delivering the supply voltages, and has its input connected via control signal line 128 to control logic 130 for receiving signals which control the switching of the supply voltages to bus lines at any given time.

Control logic 130 is also connected via control and data lines 132, 134 to bit stream switching logic 136 for delivering, respectively, streams of bits corresponding to dots to be printed, and related timing control signals which synchronize the operation of the integrated circuits 54, 66 with the powering of buses 46, 50, 60, 64. Logic 136 is connected via lines 49, 51 to circuits 54, 66 for carrying the bit streams and the timing control signals.

Control logic 130 is also connected via control signal line 17 to paper driver 16 and via control signal line 138 to paper drive power supply 140 to trigger the repositioning of the paper to each successive position at the proper time. The output of supply 140 is connected via power line 19 to paper driver 16.

Finally, control logic 130 is connected via control line 25 and data line 27 to the microprocessor (not shown) to receive the bit streams and commands directing it when to print.

Figure 4:
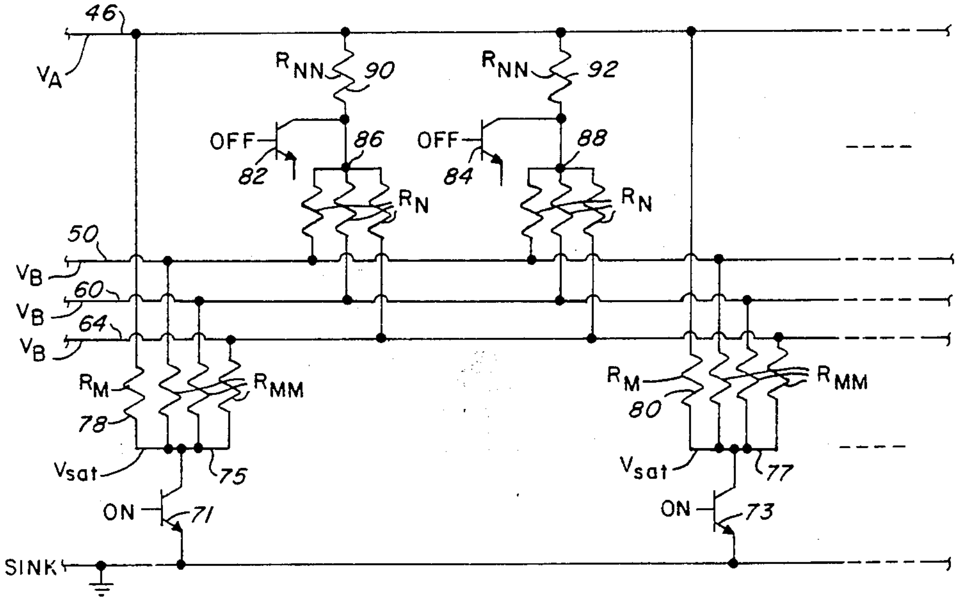
FIG. 4 is an equivalent circuit diagram for the head of FIG. 2 reflecting one possible operating condition.

Referring to FIG. 4, in one typical situation, during printing, bus 46 is driven to the higher first voltage level ($V_A$) and buses 50, 60, 64 are driven to the lower second voltage level ($V_B$). Each resistance labeled $R_M$ represents a printing element which is intended to be heated to print. $R_{MM}$ represents heating elements which are not intended to be heated to print but which are connected to the same grounding finger as an $R_M$ element. $R_{NN}$ represents a heating element which is not intended to be heated to print but is connected to the bus which is being driven to voltage $V_A$. $R_N$ represents heating elements connected between the same grounding finger as an $R_{NN}$ element, and one of the buses driven to voltage $V_B$. With transistors 71, 73 turned on, fingers 75, 77 are at a third voltage level $V_{sat}$.

Thus, $V_A$ must be high enough so that each $R_M$ heats sufficiently to cause printing from a voltage drop of $V_A - V_{sat}$ across these resistors. $V_B$ must be low enough so that each $R_{MM}$ does not heat sufficiently to print with a voltage drop of $V_B - V_{sat}$ across it, and so that each $R_{NN}$ and $R_N$ does not print from a voltage drop of $V_B - V_A$ across each network consisting of $R_{NN}$ in series with three parallel $R_N$ elements.

Subject to those constraints, it is desirable to set $V_B$ at a level which minimizes the total power dissipated in the $R_{MM}$, $R_{NN}$ and $R_N$ elements.

The voltages across the various resistors are as follows:

$$VR_M = V_A - V_{sat}$$

$$VR_{NN} = \tfrac{3}{4}(V_A - V_B)$$

$$VR_N = \tfrac{1}{4}(V_A - V_B)$$

$$VR_{MM} = V_B - V_{sat}$$

The minimum power dissipation will occur when $VR_{MM} = VR_{NN}$, i.e., when $$V_B - V_{sat} = \tfrac{3}{4}(V_A - V_B) \text{ or}$$

$$V_B = 3/7\ V_A + 4/7\ V_{sat}$$

-continued $$= 3/7\ (V_A - V_{sat}) + V_{sat}$$

Thus, $V_B$ should be set at 3/7 of the voltage across the printing resistors (i.e., 3/7 of $V_A - V_{sat}$) plus the saturation voltage ($V_{sat}$), so that $$VR_M = V_A - V_{sat}$$

$$VR_{NN} = 3/7(V_A - V_{sat})$$

$$VR_N = 1/7\ (V_A - V_{sat})$$

$$VR_{MM} = 3/7(V_A - V_{sat})$$

With that value of $V_B$ the power dissipated in each of the non-printing elements is $3/7 \times 3/7 = 9/49 = 18.2\%$ of the power dissipated in each of the printing elements.

Operation

To print a desired pattern of dots, paper 12 is moved to a succession of fixed positions relative to stripes 30, 32. At each position, power is applied to those elements 36, 38 which need to be heated in order to mark desired dots at corresponding locations on the paper. Power is applied in four stages. In each stage, $V_A$ is applied to a particular one of the buses 46, 50, 60, 64, while $V_B$ is applied to the remaining three buses. For example, $V_A$ is applied to bus 46 and $V_B$ is applied to buses 50, 60, 64. Under these circumstances, only half of the elements 36 on stripe 30, (i.e., those which are connected to bus 46) can be selected to heat to print corresponding dots. A particular one of those elements heats to print by having integrated circuits 54, 66 connect to ground the finger 52, 57 which leads from the element to be heated, thus establishing $V_A - V_{sat}$ across the element. For example, in FIG. 2, element 70 can be heated to print a corresponding dot by grounding finger 100 to establish a current path (indicated by arrow 102). Appropriate bits are loaded into integrated circuits 54, 66 to cause, while $V_A$ is being applied to bus 46, the desired elements to be grounded and the others to remain floating.

Many unwanted parasitic electrical paths exist along the length of head 14 tending to drive buses 50, 60, 64 to $V_A$, for example the path (arrow 104) from bus 46 via two elements to bus 50. Were bus 50 actually driven to $V_A$, then element 72, being connected between $V_A$ and $V_{sat}$, would erroneously print a dot. However, because $V_B$ applied to bus 50 is regulated to be constant (notwithstanding parasitic paths such as 104), bus 50 cannot be driven to $V_A$. Because $V_B$ is insufficient to cause printing by element 72, no erroneous printing occurs.

In the second stage of printing, the paper remains in the same position, $V_A$ is applied to bus 50, $V_B$ is applied to buses 46, 60, 64, and appropriate ones of fingers 52 and 57 are grounded to cause printing by desired ones of that half of the elements on row 30, which are connected to bus 50.

A similar procedure is followed in the third and fourth stages with the $V_A$ being applied first to bus 60, then to bus 64. Thus, in the course of the four stages, any of the elements on rows 30, 32 can be caused to print.

Next the paper is moved along axis 42 by a distance equal to the width of row 30 to a new position, at which the four printing stages are again repeated, this time with an updated set of fingers 52, 57 being grounded in order to print desired dots at the new paper position.

The paper is then moved to a succession of new fixed positions, at each of which the four printing stages are repeated. Because the elements on rows 30, 32 are staggered with respect to each other, dots can be printed at all desired places on the page. The loading of bits into the shift registers, the switching of voltages onto buses 46, 50, 60, 64, and the advance of the paper to successive positions, are all synchronized by control signals delivered from power supply and control logic 130. The microprocessor to which the power supply and control logic 18 are connected is programmed to provide the needed bit patterns for integrated circuits 54, 66, based on the characters or graphic symbols to be printed.

By holding the non-printing buses to a fixed second voltage level insufficient for causing marking, no diodes are required to counteract the parasitic voltages which could otherwise appear on the non-printing buses. Eliminating the diodes reduces the design and manufacturing costs and improves the reliability of the head, by making more space available on the head substrate. The availability of space also permits using four buses, two on each side of the elements. Four buses enables using two rows of printing elements, each served by two of the buses. By having each sink conductor connect to both rows, each sink conductor can serve four elements. Having alternate ones of the sink conductors lead out to different sides of the element rows, reduces the density of the required switching circuitry on the substrate, thus reducing design and manufacturing complexity and cost, and improving reliability. Using four buses permits four-stage printing which reduces the peak power load. Offseting the two rows of elements with respect to each other assures that every location on a page can be printed.

Other embodiments are within the following claims. For example, more than two rows of elements could be used, with the number of buses being double the number of rows.

I claim:

1. A thermal print head comprising a first continuous stripe of material along which is defined a first row of electrical heating elements, circuitry connected to said elements for heating selected said elements to cause marking in corresponding regions of a surface to be printed on, said first row of elements being configured such that, when two adjacent said elements are heated, a non-marked gap appears between the resulting two marked regions on said surface, and a second continuous stripe of material along which is defined a second row of electrical heating elements connected to said circuitry and configured such that, when said surface to be printed on is relocated (in a direction perpendicular to said rows) to a position where said marked regions lie adjacent said second row of heating elements, an element of said second row can be heated to cause marking in said gap.

2. A thermal print head of claim 1 wherein said circuitry comprises leads that overlap said continuous stripes to define overlap areas, said elements being defined between the locations where successive said leads overlap said stripes, and said elements and said spaces having the same lengths in the direction of the length of said rows.

3. The thermal print head of claim 2 further comprising buses for delivering power to said elements, each said bus being connected in common to a plurality of said elements, a power source for applying to one of said buses a first voltage level sufficient, when applied to one said element to which said bus is connected, to cause marking of a surface to be printed on, the connections between said buses and said elements being arranged to define both an electrical path from said one bus to said one element to cause said marking, and unwanted electrical paths from said one bus via said elements to other said buses, said power source being arranged to hold said other buses at a fixed second voltage level insufficient for causing said marking.

4. A thermal print head comprising at least two parallel rows of electrical heating elements, buses for delivering power to said elements, each said bus being connected in common to a plurality of said elements, a power source for applying to one of said buses a first voltage level sufficient, when applied to one said element to which said bus is connected, to cause marking of a surface to be printed on, the connections between said buses and said elements being arranged to define both an electrical path from said one bus to said one element to cause said marking, and unwanted electrical paths from said one bus via said elements to other said buses, said power source being arranged to hold said other buses at a fixed second voltage level insufficient for causing said marking.

5. The thermal print head of claim 4 further comprising conductors for selectively connecting each said element to a predetermined third voltage level, the voltage difference between said first and third voltage levels being sufficient to cause said marking, the voltage difference between said second and third voltage levels being insufficient to cause said marking, and the voltage difference between said first and second voltage levels being insufficient to cause said marking.

6. The thermal print head of claim 5 wherein said second voltage level is lower than said first voltage level and is selected to have a value, relative to said first voltage level, which minimizes the aggregate power loss in said heating elements.

7. The thermal print head of claim 6 wherein said second voltage level is held at a value equal to said third voltage level plus 3/7 of the difference between said first voltage level and said third voltage level.

* * * * *